(12) United States Patent
VanCampenhout et al.

(10) Patent No.: US 6,428,045 B1
(45) Date of Patent: Aug. 6, 2002

(54) STEERING COLUMN TETHER STRAP

(75) Inventors: Adrian VanCampenhout, Plymouth; Jill Katic, Fenton; Judson Estes, Milford; Curtis Sims, Clarkston; Mustafa Khalifa, Dearborn, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/221,102

(22) Filed: Dec. 28, 1998

(51) Int. Cl.$^7$ ................................................. B62D 1/18
(52) U.S. Cl. ........................................ 280/779; 280/777
(58) Field of Search ............................... 280/777, 779, 280/750; 188/371

(56) References Cited

U.S. PATENT DOCUMENTS

| | | | | |
|---|---|---|---|---|
| 4,355,820 A | * | 10/1982 | Kitagawa et al. | ............ 280/779 |
| 4,362,319 A | * | 12/1982 | Masaki et al. | ............... 280/779 |
| 4,365,826 A | * | 12/1982 | Iriyama | ........................ 280/779 |
| 4,826,234 A | * | 5/1989 | Komatsu | ...................... 296/70 |
| 4,946,192 A | * | 8/1990 | Kuwahara | .................... 280/751 |
| 4,951,522 A | * | 8/1990 | Chowdhury et al. | ........... 74/492 |
| 4,966,391 A | * | 10/1990 | Sobodos et al. | ............. 280/777 |
| 4,978,138 A | * | 12/1990 | Hikone et al. | ............... 280/777 |
| 5,228,359 A | | 7/1993 | Thomas | |
| 5,356,179 A | | 10/1994 | Hildebrandt et al. | |
| 5,390,956 A | | 2/1995 | Thomas | |
| 5,452,916 A | * | 9/1995 | Beecher et al. | ............. 280/777 |
| 5,497,675 A | | 3/1996 | Brown et al. | |
| 5,588,514 A | | 12/1996 | Snell | |
| 5,615,916 A | * | 4/1997 | Fujiu et al. | .................. 280/777 |
| 5,755,461 A | | 5/1998 | Halacka | |

* cited by examiner

Primary Examiner—Brian L. Johnson
Assistant Examiner—Deanna Draper
(74) Attorney, Agent, or Firm—Edwin W. Bacon, Jr.

(57) ABSTRACT

A steering column restraining device for a vehicle, wherein the vehicle includes a steering column mounted to a steering column support bracket. The steering column restraining device comprises a first bracket mounted to the steering column support bracket and a second bracket mounted to a floorboard of the vehicle. The first bracket and the second bracket are interconnected using a strap extending therebetween. The device thereby minimizes upward translation of the steering column during impact, which maximizes the effectiveness of the airbag and further minimizes potential injury to the driver.

4 Claims, 3 Drawing Sheets

STEERING COLUMN TETHER STRAP

FIELD OF THE INVENTION

The present invention relates to vehicle safety devices and, more particularly, to a vehicle safety device having a tether strap mounted to a steering column support bracket to minimize uplift of the steering column during a vehicle collision.

BACKGROUND OF THE INVENTION

As is well known, vehicle safety and crash worthiness is an ongoing concern in the development of new vehicles. Since the 1960's, automobile manufactures have made considerable strides in the developed of various safety devices and systems intended to protect the vehicle occupants during a collision. In recent designs, vehicle airbags have been introduced and widely used in conjunction with other restraint systems to protect the occupant. An airbag is commonly mounted in the steering wheel to absorb momentum of the driver relative to the steering wheel and column. However, during a severe impact, the engine and front structural members are commonly forced rearward toward the passenger compartment. In many cases, this force may cause the steering wheel and column to rotate upwardly, thereby causing the airbag to be deployed in a less-than-ideal position. That is, the airbag may be deployed at a greater inclined angle than the pre-impact position. This greater inclined deployment angle of the airbag may not afford maximum protection to the driver during a collision.

Attempts have been made to improve the structural integrity of the vehicle between the engine compartment and the passenger compartment to minimize the intrusion into the passenger compartment during a collision. One design employs a tube disposed transversely between the A-pillars of the vehicle for supporting the steering column of the vehicle. This design is commonly known as a cross-car tube. The cross-car tube is coupled to the plenum to provide increased rigidity in the vehicle and further minimize the rotation of the steering column during impact. However, this design is disadvantageous in that it requires additional space in the dashboard area, which is not available in many modern vehicle designs. Furthermore, this design increases the weight and manufacturing cost of the vehicle.

Accordingly, there exists a need in the relevant art to provide a system capable of minimizing the rotation of the steering column during impact in limited space applications. Furthermore, there exists a need in the relevant art to provide a system to maintain the steering column position during impact so as to improve the effectiveness of a steering wheel-mounted airbag.

SUMMARY OF THE INVENTION

According to a preferred embodiment of the present invention, a steering column restraining device for a vehicle having an advantageous construction is disclosed. The vehicle includes a steering column mounted to a steering column support bracket. The steering column restraining device comprises a first bracket mounted to the steering column support bracket and a second bracket mounted to a floorboard of the vehicle. The first bracket and the second bracket are interconnected using a strap extending therebetween. The device minimizes upward translation of the steering column during impact, thereby maximizing the effectiveness of the airbag and further minimizing potential injury to the driver.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
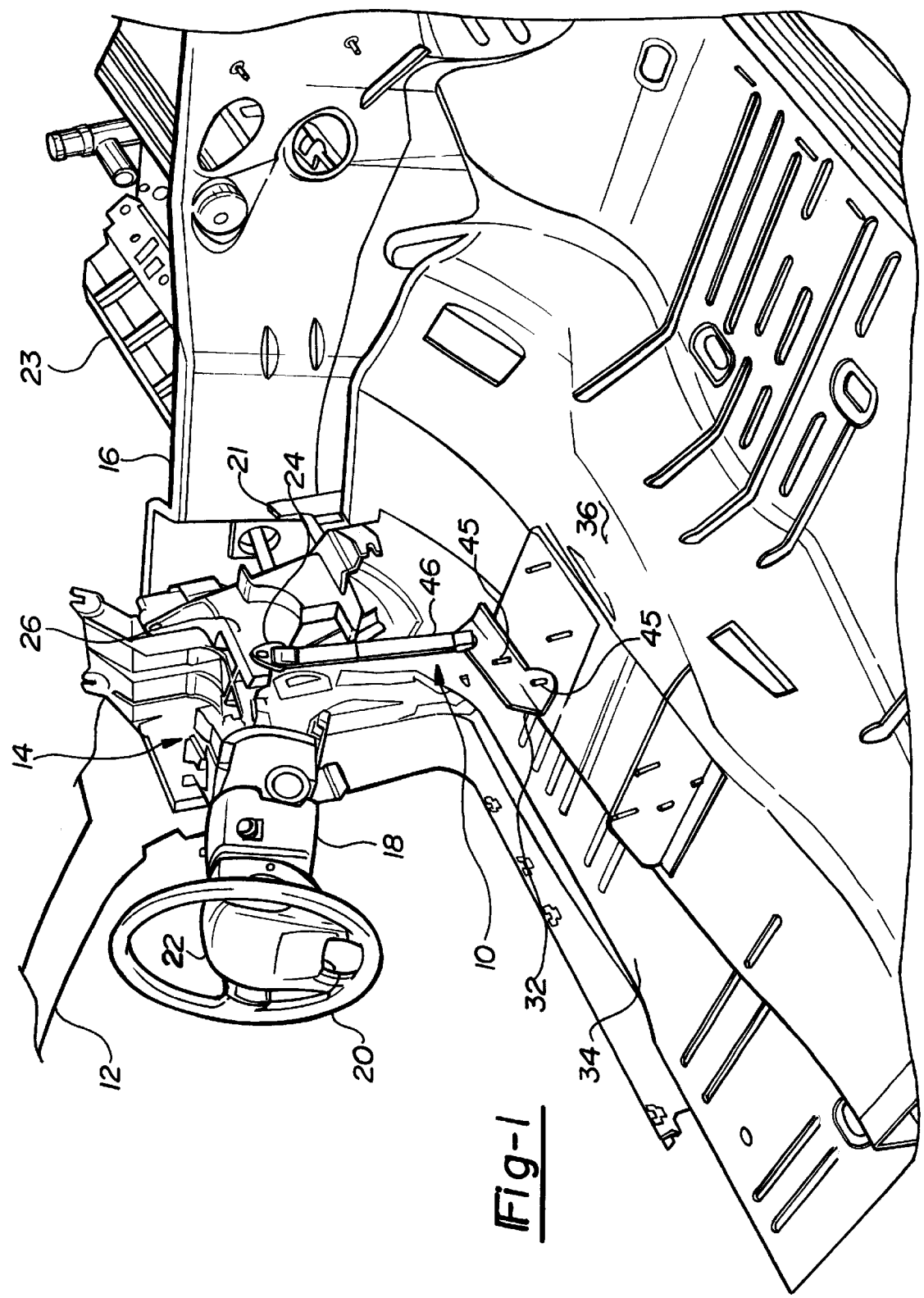
FIG. 1 is a perspective view of a vehicle incorporating the steering column restraining device according to the present invention.

The following description of the preferred embodiment is merely exemplary in nature and is in no way intended to limit the invention, its application, or uses. For example, the steering column restraining device of the present invention may have utility in any vehicle where translation of a steering column or other feature must be minimized during vehicle impact.

Referring to the figures, a steering column-restraining device 10 is shown for use within a vehicle 12. Vehicle 12 includes a steering column support bracket 14 fixedly mounted to a plenum 16. Steering column support bracket 14 is adapted to receive and support a steering column 18. Specifically, steering column 18 is fixed to steering column support bracket 14 using conventional means, such as bolts, to provide proper positioning of a steering wheel 20 within vehicle 12. Steering column support bracket 14 is further mounted to an intermediate bracket 21 and various other mounting structures. Intermediate bracket 21 is generally disposed between steering column support bracket 14 and an engine 23 of vehicle 12. As can be appreciated by one skilled in the art, during a severe frontal collision, the lower dash panel and engine 23 of vehicle 12 may be forced rearward against the intermediate bracket 21. This rearwardly directed force might act upon steering column support bracket 14 at a position below plenum 16. Consequently, the rearwardly-directed force may produce a moment in steering column support bracket 14 about plenum 16, thereby causing steering column support bracket 14 and steering wheel 20 to be translated generally upward. This generally upward translation may cause an airbag 22 disposed in steering wheel 20 to be deployed in a generally upward direction, which may not maximize the effectiveness of airbag 22.

Figure 2:
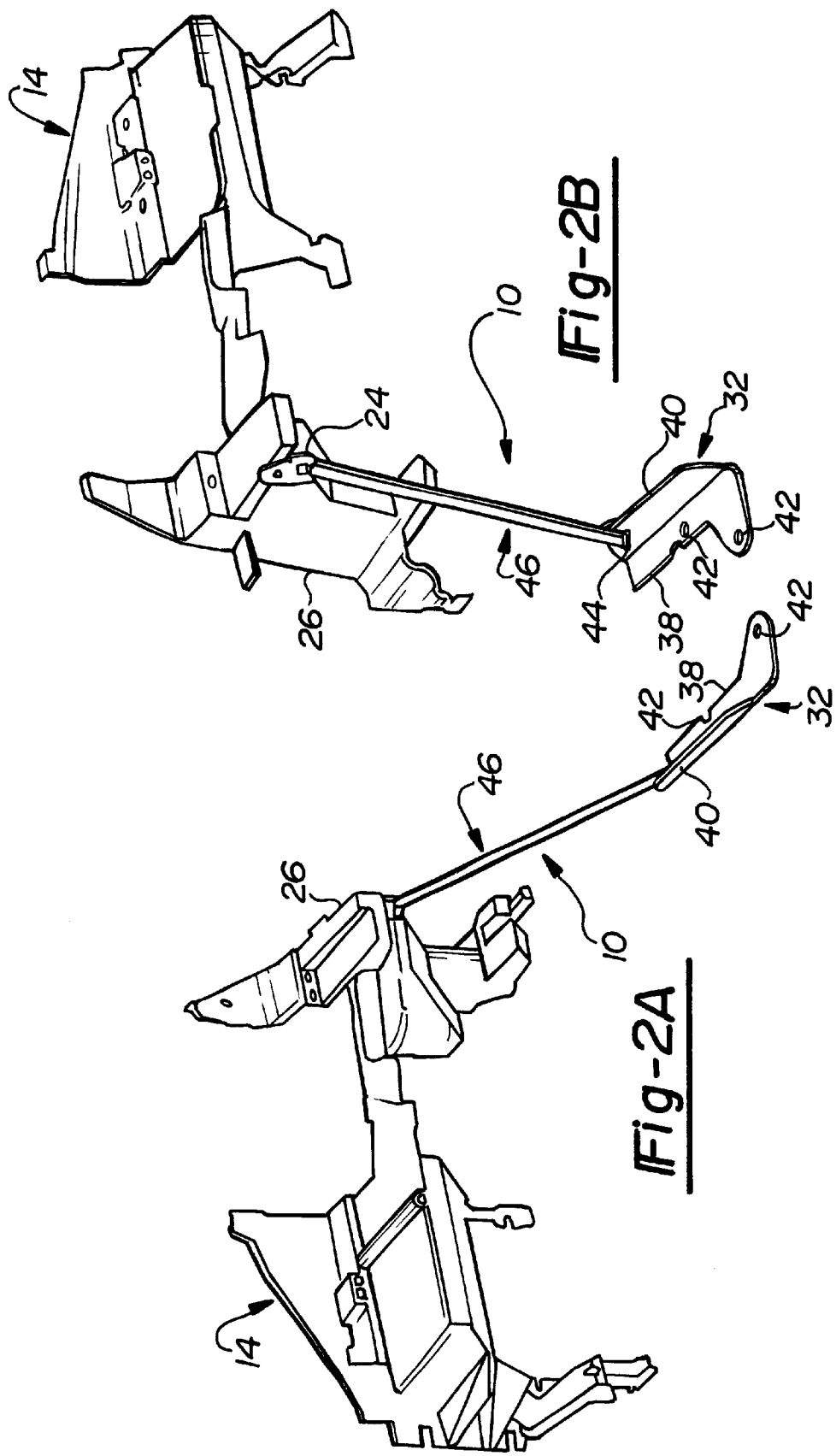
FIG. 2a is a perspective view of a steering column support bracket and the steering column restraining device adapted for use in a left-hand drive vehicle.
FIG. 2b is a perspective view of a steering column support bracket and the steering column restraining device adapted for use in a right-hand drive vehicle.
Figure 3:
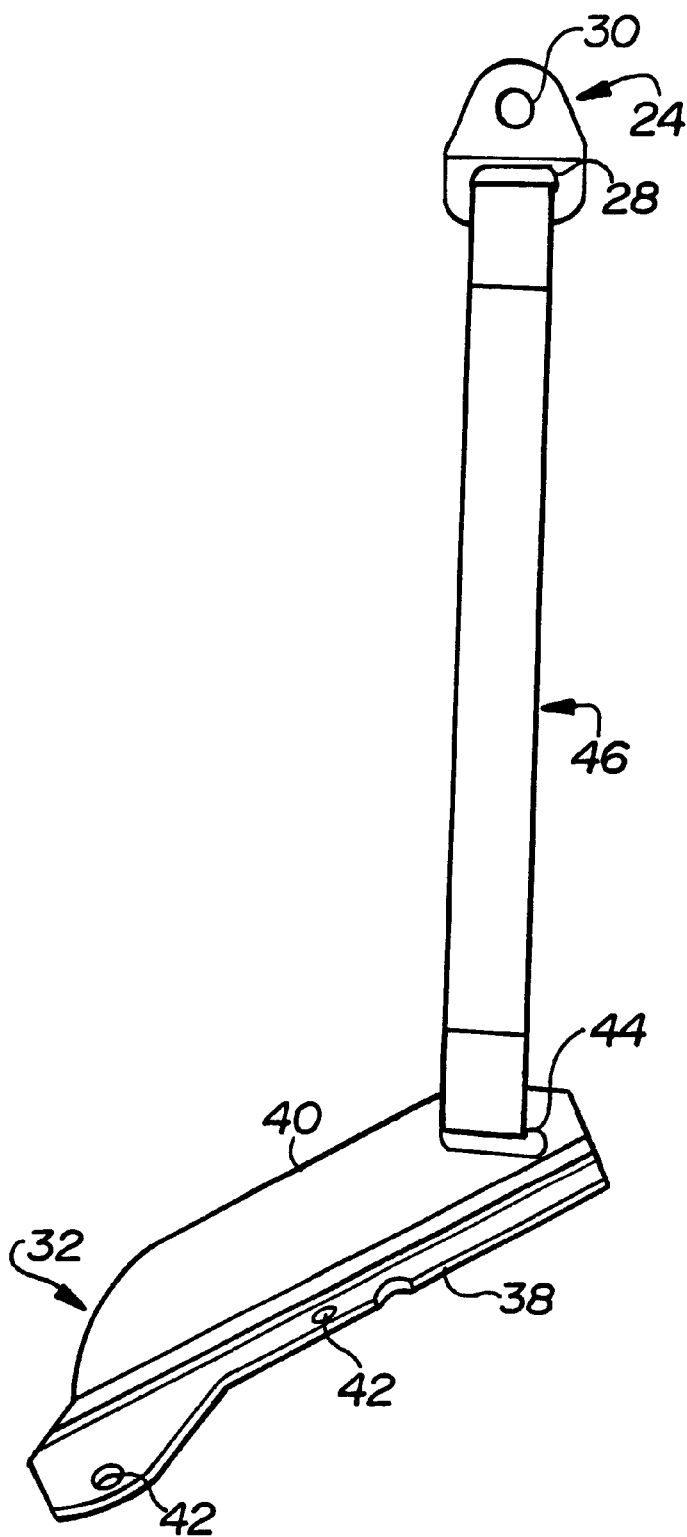
FIG. 3 is an inboard view of the steering column restraining device adapted for use in a left-hand drive vehicle.

To minimize the upward translation of steering column 18 and steering wheel 20, steering column restraining device 10 passively restrains steering column support bracket 14 during a collision. As best seen in FIGS. 2a, 2b, and 3, steering column restraining device 10 includes an upper mounting bracket 24 mounted to a sidewall 26 of steering column support bracket 14. Upper mounting bracket 24 includes an elongated slot 28 and an aperture 30. Aperture 30 is adapted to receive a threaded stud (not shown), such as a rivet-stud and bolt, therethrough that is fixedly mounted to steering column support bracket 14. Preferably, upper mounting bracket 24 is made of a high strength steel. It should be appreciated that upper mounting bracket 24 may have any shape conducive to mating with steering column support bracket 14. Likewise, upper mounting bracket 24 may be mounted to steering column support bracket 14 using other mounting method known in the art, such as welding or by employing a tapping plate and bolt assembly.

Steering column restraining device 10 further includes a lower mounting bracket 32 mounted to a floorboard 34 of vehicle 12. Preferably, lower mounting bracket 32 is mounted to a center support or tunnel 36 commonly present in vehicle designs having a transmission belt housing or floorpan formation. Lower mounting bracket 32 includes a base portion 38 and an upturned portion 40. Base portion 38 includes a plurality of apertures 42 and upturned portion 40 includes an elongated slot 44. The plurality of apertures 42 are each adapted to receive a fastener 45 therethrough for mounting lower mounting bracket 32 to tunnel 36. Preferably, lower mounting bracket 32 is made of a high strength steel.

It should be appreciated that upper mounting bracket 24 and lower mounting bracket 32 may have any shape conducive to mating with steering column support bracket 14 and tunnel 36, respectively. Likewise, upper mounting bracket 24 and lower mounting bracket 32 may be mounted using other mounting method known in the art, such as welding. Still further, steering column restraining device 10 may be employed in vehicles having the steering wheel mounted on the left-side (see FIG. 2a) or right-side (see FIG. 2b).

Steering column restraining device 10 still further includes a tether or strap 46 interconnecting upper mounting bracket 24 and lower mounting bracket 32. Specifically, strap 46 extends through elongated slot 28 of upper mounting bracket 24 and elongated slot 44 of lower mounting bracket 32. Strap 46 is made of a flexible material, such as kevlar braid, nylon webbing, or the like. Such material is selected for its strength and minimal elongation during loading. Preferably, strap 46 is made of a 7-panel nylon webbing having a width of approximately 1–¾" to reduce material costs. However, kevlar braid having a width of approximately 1–⅜" may also be used. Strap 46 is fastened to upper mounting bracket 24 and lower mounting bracket 32 using an overlapped and sewn connection; however, other connection methods known in the art may be used.

During assembly, steering column restraining device 10 is mounted within vehicle 12 such that upper mounting bracket 24 is secured to sidewall 26 of steering column support bracket 14 and lower mounting bracket 32 is secured to tunnel 36. Preferably, strap 46 would have a length sufficient to conveniently install, yet would not require extensive deflection or rotation of steering column support bracket 14 before restricting movement of steering column support bracket 14.

In operation, steering column restraining device 10 of the present invention minimizes the upward rotation or translation of steering column support bracket 14. Consequently, upward rotation or translation of steering column 18 and steering wheel 20 are also minimized, thereby retaining steering wheel 20 in approximately a pre-impact position. In other words, as the vehicle front end and engine are forced rearward during a severe collision, the intermediate bracket and various other vehicle components are then forced rearward and cause steering column support bracket 14 to rotate about plenum 16. Steering column restraining device 10 minimizes the rotation of steering column support bracket 14 by resisting the upward translation of steering column support bracket 14 relative to floorboard 34 or tunnel 36. Specifically, upper mounting bracket 24, lower mounting bracket 32, and strap 46 withstand the loads forcing steering column support bracket 14 upward, thereby maintain the pre-impact position of steering column 18 and steering wheel 20. By way of non-limiting example, steering column restraining device 10 may carry an approximate load of 1600–2000 pounds during an impact. By maintaining the pre-impact position of steering wheel 20 and, thus, airbag 22, it is believed that the effectiveness of airbag 22 can be maximized.

As should be appreciated, the steering column restraining device according to the present invention dramatically reduces the upward translation and rotation of the steering column and steering wheel, thereby improving the performance of a driver's airbag. By way of non-limiting example, a reduction in chest acceleration of a test dummy of 7.3 g's (gravitational acceleration) is realized in the Federal Motor Vehicle Safety Standard 208 test for a vehicle having the steering column restraining device according to the present invention relative to a baseline vehicle. Moreover, the steering column restraining device according to the present invention eliminates the need for a cross-car tube, thereby maximizing vehicle packaging.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A steering column restraining device for a vehicle, said vehicle having a steering column mounted to a steering column support bracket, said device comprising:

a first bracket adapted to be mounted to the steering column support bracket;

a second bracket adapted to be mounted to a floorboard of the vehicle; and a braided strap interconnecting said first bracket and said second bracket for minimizing upward translation of the steering column during impact, said strap being laterally flexible under compressional loads.

2. The device according to claim 1 wherein said braided strap is a webbing.

3. A vehicle having a steering column, said vehicle comprising:

a steering column support bracket for supporting the steering column;

an upper mounting bracket fixedly mounted to said steering column support bracket;

a lower mounting bracket fixedly mounted to a lower portion within the vehicle; and a braided strap interconnecting said upper mounting bracket and said lower mounting bracket to minimize upward translation of the steering column, said interconnection device being laterally resilient under compressional loads.

4. A vehicle having a steering column, said vehicle comprising:

a steering column support bracket for supporting the steering column;

an upper mounting bracket fixedly mounted to said steering column support bracket;

a lower mounting bracket fixedly mounted to a lower portion within the vehicle; and a webbing interconnecting said upper mounting bracket and said lower mounting bracket to minimize upward translation of the steering column, said interconnection device being laterally resilient under compressional loads.

* * * * *